United States Patent
Mazur et al.

(10) Patent No.: US 9,774,631 B2
(45) Date of Patent: Sep. 26, 2017

(54) TLS CONNECTION ABANDONING

(71) Applicant: International Business Machines Corporation, Armonk, NY (US)

(72) Inventors: Steven Ashley Mazur, Johns Creek, GA (US); Matthew Joseph Kubilus, Jr., Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 14/527,475

(22) Filed: Oct. 29, 2014

(65) Prior Publication Data

US 2016/0127414 A1    May 5, 2016

(51) Int. Cl.
  *H04L 29/06* (2006.01)
  *H04L 29/08* (2006.01)
  *H04L 9/32* (2006.01)

(52) U.S. Cl.
  CPC ............ *H04L 63/18* (2013.01); *H04L 9/3242* (2013.01); *H04L 9/3263* (2013.01); *H04L 63/0428* (2013.01); *H04L 63/1408* (2013.01); *H04L 63/168* (2013.01); *H04L 63/20* (2013.01); *H04L 67/141* (2013.01); *H04L 67/2804* (2013.01); *H04L 67/42* (2013.01)

(58) Field of Classification Search
  CPC ..... H04L 67/141; H04L 63/166; H04L 63/04; H04L 9/3242
  See application file for complete search history.

(56) References Cited

U.S. PATENT DOCUMENTS

| | | | |
|---|---|---|---|
| 6,829,238 B2 | 12/2004 | Tokuyo et al. | |
| 7,480,301 B2 | 1/2009 | Krishnan et al. | |
| 7,969,976 B2 | 6/2011 | Ishikawa et al. | |
| 8,214,635 B2 | 7/2012 | Wang et al. | |
| 8,312,308 B2 | 11/2012 | Kanekar | |
| 8,320,384 B2 | 11/2012 | Oouchi et al. | |
| 8,402,557 B2 | 3/2013 | Ginter et al. | |
| 8,418,241 B2 | 4/2013 | Elzur | |
| 2004/0015725 A1* | 1/2004 | Boneh ................... | H04L 63/166 713/160 |
| 2008/0065880 A1* | 3/2008 | Martin .................. | H04L 63/123 713/156 |
| 2010/0138910 A1 | 6/2010 | Aldor et al. | |
| 2012/0216275 A1 | 8/2012 | Boscolo et al. | |
| 2013/0312054 A1* | 11/2013 | Wang .................. | H04L 63/0236 726/1 |

(Continued)

*Primary Examiner* — Khang Do
(74) *Attorney, Agent, or Firm* — Jeffrey S. LaBaw; David H. Judson

(57) ABSTRACT

A network-based appliance includes a mechanism to enable the appliance to extract itself from man-in-the-middle (MITM) processing during a client-server handshake and without interrupting that connection. The mechanism enables the appliance to decide (e.g., based on a rule match against a received server certificate) to stop performing MITM during the handshake and thus to de-insert itself transparently, i.e., without interfering or signaling to either end of the session that this operation is occurring. Once the connection is abandoned in the manner, the appliance ignores additional traffic flow and thus can free up processing resources (CPU, memory, and the like) that would otherwise be required to decrypt the connection (even if no further inspection or rewrite processing would be expected to occur).

21 Claims, 5 Drawing Sheets

(56) References Cited

U.S. PATENT DOCUMENTS

| | | | |
|---|---|---|---|
| 2014/0007192 A1* | 1/2014 | Qureshi | G06F 21/10 726/3 |
| 2014/0082204 A1* | 3/2014 | Shankar | H04L 63/166 709/227 |
| 2014/0115702 A1* | 4/2014 | Li | G06F 11/30 726/23 |
| 2014/0122865 A1* | 5/2014 | Ovsiannikov | H04L 29/08792 713/151 |
| 2015/0058916 A1* | 2/2015 | Rostami-Hesarsorkh | H04L 63/1408 726/1 |
| 2015/0113264 A1* | 4/2015 | Wang | H04L 63/0823 713/151 |

* cited by examiner

FIG. 6

600 — /* Setup minimal SSL CTX */
Xss_ctx = SSL_CTX_new(SSLv23_client_method());

602 — /* Create minimal SSL instance */
Xss_ssl = SSL_new(client_ctx);

604 — /* Place the original client_hello in the SSL instance */
install_client_hello(Xss_ssl, original_client_hello);

606 — /* Gather data from the client hello */
orig_ssl_state = process_client_hello(Xss_ssl);

/* Set TLS extensions and other features */
608 — SSL_set_tlsext_host_name(Xss_ssl, orig_ssl_state->hostname);
SSL_set_cipher_list(Xss_ssl, orig_ssl_state->cipher_list);

/* Indicate that we don't wish to overwrite client_hello */
610 — Xss_ssl->save_hello = true;

/* Since we disable generating client_hello, this simply does our
HMAC calculation for the install client_hello */
612 — SSL_do_handshake(Xss_ssl);

TLS CONNECTION ABANDONING

BACKGROUND OF THE INVENTION

Technical Field

This disclosure relates generally to information security on network-connected appliances.

Background of the Related Art

Security threats are continually evolving. With the rapid growth of cutting-edge web applications and increased file sharing, activities that may have been considered harmless in the past could become potential openings for attackers. Traditional security means, such as anti-malware software and firewalls, have become easier to bypass. Thus, there is a significant need for more advanced, proactive threat protection that can help provide comprehensive security against new and emerging threats.

Network-connected, non-display devices ("appliances) are ubiquitous in many computing environments. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. To this end, it is well-known to use such middleware devices to perform computationally-expensive processes related to network security. For example, network intrusion prevention system (IPS) appliances are designed to sit at the entry points to an enterprise network to protect business-critical assets, such as internal networks, servers, endpoints and applications, from malicious threats.

The use of Secure Sockets Layer (SSL) and/or Transport Layer Security (TLS)-based encryption for network communications generally inhibits the ability to identify and mitigate threat traffic from within the network. It is now estimated that upwards of two-thirds or more of all business network traffic is conveyed over SSL/TLS. This means that organizations relying on network communications typically are unable to protect (from the network) the endpoints in their enterprise that may be susceptible to such threats. Indeed, the vast majority of SSL/TLS communications use only server authentication, i.e., the server is authenticated via the SSL/TLS protocols to the client, but the client is unauthenticated with respect to the server. This authentication asymmetry provides the opportunity for a process to interpose itself between client and server in such a way as to enable decryption of communications and inspection of its contents. Such a "man-in-the-middle" (MITM) process may be malicious, or it may be used for legitimate reasons, such as packet inspection (for threat detection).

Thus, it is known to provide a transparent (MITM) proxy between a client and a server that can be configured to create and manage two separate SSL/TLS sessions, one as the client to the target server, and another as a server to the initiating client. The intermediate proxy thus appears to the server as a client, and to the client as the intended server. Communications initiated from the client, and any responses received from the server, theoretically are then available for inspection and subsequent action. Current transparent proxies that operate in this manner, however, require that once a session is "taken over," the inspection process must continue until session termination. This is true even in the scenario where the MITM determines (early-on) that it should not perform (or should cease performing) an inspection. In one example scenario, the MITM intercepts the traffic and, as it is setting up the two separate SSL/TLS sessions, it learns (e.g., from receipt of the server certificate) that interception should not occur (e.g., because the server certificate matches some policy restricting interception). In this scenario, however, the MITM cannot simply abandon the TLS connection(s) that it is setting up. As a consequence, systems that employ this type of MITM inspection often consume system resources unnecessarily for the vast bulk of the traffic so handled. This inability to abandon the TLS connection is highly inefficient.

There remains a need to provide for an intermediary (whether a proxy or otherwise) that can transparently de-insert itself from the client-server path without interfering or signaling this operation to either end of the session.

BRIEF SUMMARY

A network-based appliance includes a mechanism to enable the appliance to extract itself from man-in-the-middle (MITM) processing during a client-server handshake and without interrupting that connection. The mechanism enables the appliance to decide (e.g., based on a configured policy) to stop performing MITM-ing during the handshake and thus to de-insert itself transparently, i.e., without interfering or signaling to either end of the session that this operation is occurring. Once the connection is abandoned in the manner, the appliance ignores additional traffic flow and thus can free up processing resources (CPU, memory, and the like) that would otherwise be required to decrypt the connection—even if no further inspection or rewrite processing would be expected to occur.

According to this disclosure, a method is operative within an intermediary positioned between a client and a server and that can intercept, decrypt, inspect and optionally rewrite flows. The intermediary may operate by TCP session inspection, or as a transparent proxy. It may include a client-facing server component, and a server-facing client component. The method begins in response to detection during connection establishment of a session initiation request message (e.g., a client hello) from a client and intended for the server. The client-facing server component responds to this receipt by withholding response to the client (e.g., that the session initiation request message has been received). A new session is then established at the server-facing client component, preferably by initiating an SSL instance to the server, placing the session initiation request message (received from the client) in the SSL instance, and then configuring a cryptographic context for the new session. This sequence for creating the new session reverses the usual operation of the server-side component (namely, initiating the SSL instance, configuring a cryptographic context, and then issuing to the server a new client hello). By installing the original client hello in the new session (and instead of issuing a new client hello), the server-side portion mimics the client to the server in a manner that guarantees integrity of handshake message authentication codes (HMACs) across the flow in the event MITM determines it will abandon the connection establishment. To that end, the method continues with the release to the server of the session initiation request message received from the client. Data (e.g., a server hello message, a server certificate, and a server done message) is then received from the server. The server-side portion reads the data and then determines whether to resume establishment of the connection between the client and the server, the connection being represented by the original client hello. This determination may be made by comparing the server certificate against a configured policy, and it preferably occurs prior to initiating any key exchange or transfer of any other cryptographic information to the server with respect to the new session. In response to determining to resume establishment of the connection, all of the data by then received from the server is then released to the client. The man-in-the-middle thus abandons the establishment of the connection, thereby freeing up the local processing and storage resources that would otherwise be required to complete the man-in-the-middle connections and to continue to decrypt the connection (even if no further inspection or flow rewrite are required).

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 6 is a representative pseudo code listing that enables the MITM to cause its server-facing component to mimic the requesting client.

DETAILED DESCRIPTION OF AN ILLUSTRATIVE EMBODIMENT

Figure 1:
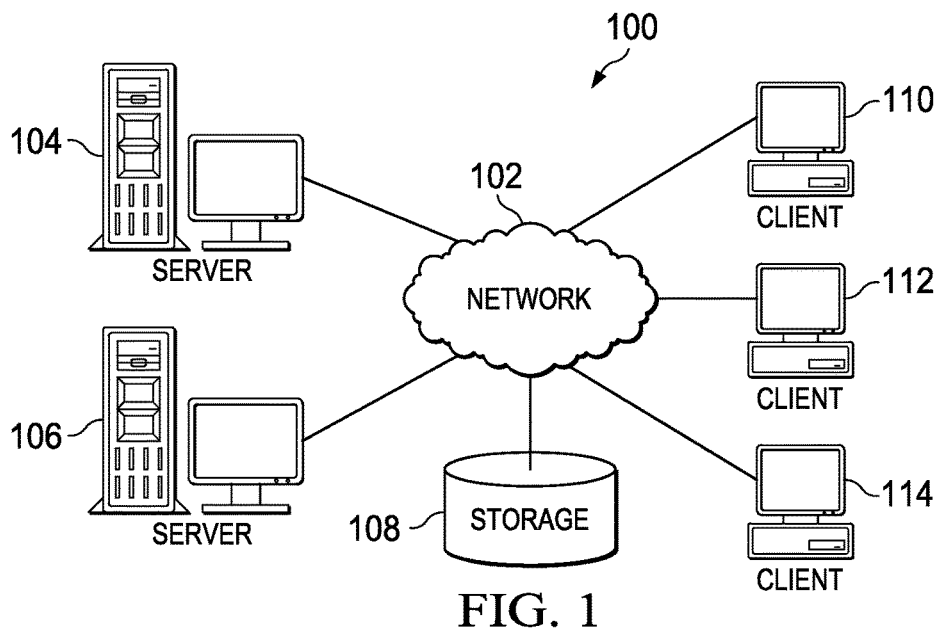
FIG. 1 depicts an exemplary block diagram of a distributed data processing environment in which exemplary aspects of the illustrative embodiments may be implemented.
Figure 2:
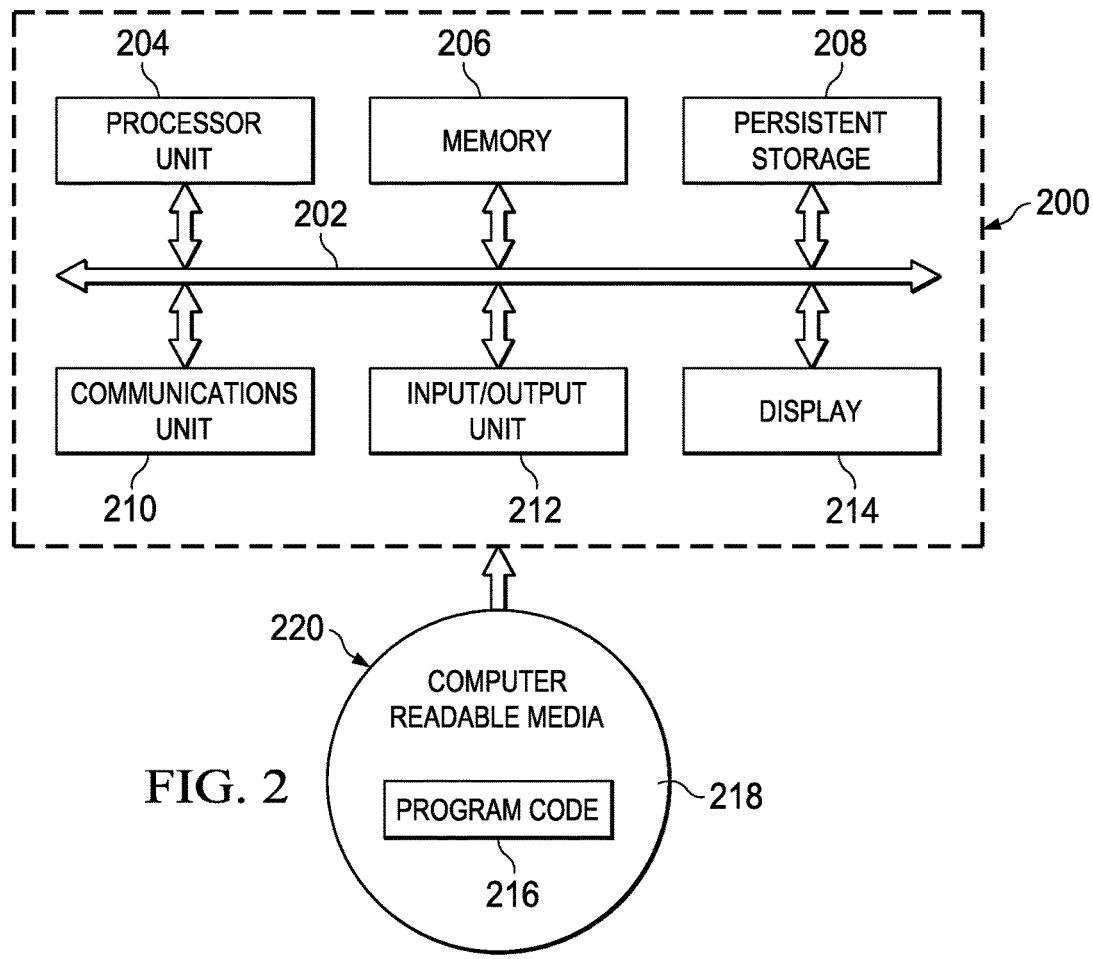
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

As further background, Secure Sockets Layer (SSL) is a well-known cryptographic protocol that is used to secure communications over networks such as the Internet. Cryptographic protocols such as SSL are often based on public key cryptographic systems, such as the RSA (Rivest, Shamir and Adelman) encryption algorithm. For a traditional RSA-based SSL session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSL server. The SSL server has a private decryption key, which is then used to decrypt the encrypted pre-master secret. At this point, both the client and the server have the original pre-master secret and can use it to generate the symmetric key used for actual encrypted and secure data exchange.

Encrypted traffic on the web occurs by a chain of trust. Each web server has a certificate that is presents to each client (usually a web browser) to indicate that they are who they say they are. Web servers often get these certificates from an authority (a Certificate Authority, or CA) that can vouch for the legitimacy of the web server. The server's certificate indicates the authority from which the certificate was obtained (the "issuer") Web browsers typically have a list of issuers that they trust. When a web browser is presented with a certificate from a web server, the browser will check the issuer and match it against its trusted list. If a match is found, the connection will continue; if a match is not found, the browser usually will present a warning and perhaps reject the connection. A CA is not necessarily a special entity other than the fact that it is trusted. Any entity can set itself up to trust, or sign, certificates. A certificate can trust itself, which is referred to as a self-signed certificate. To interoperate with a client using SSL/TLS, it is necessary to create certificates that the client will implicitly trust. With respect to a network appliance (as described below), it is presumed that an administrator can configure enterprise clients to trust the appliance to sign certificates. In effect, the issuer of the appliance then is on the browser's list of trusted issuers.

Network-Connected Secure Appliances

A network appliance typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

Figure 3:
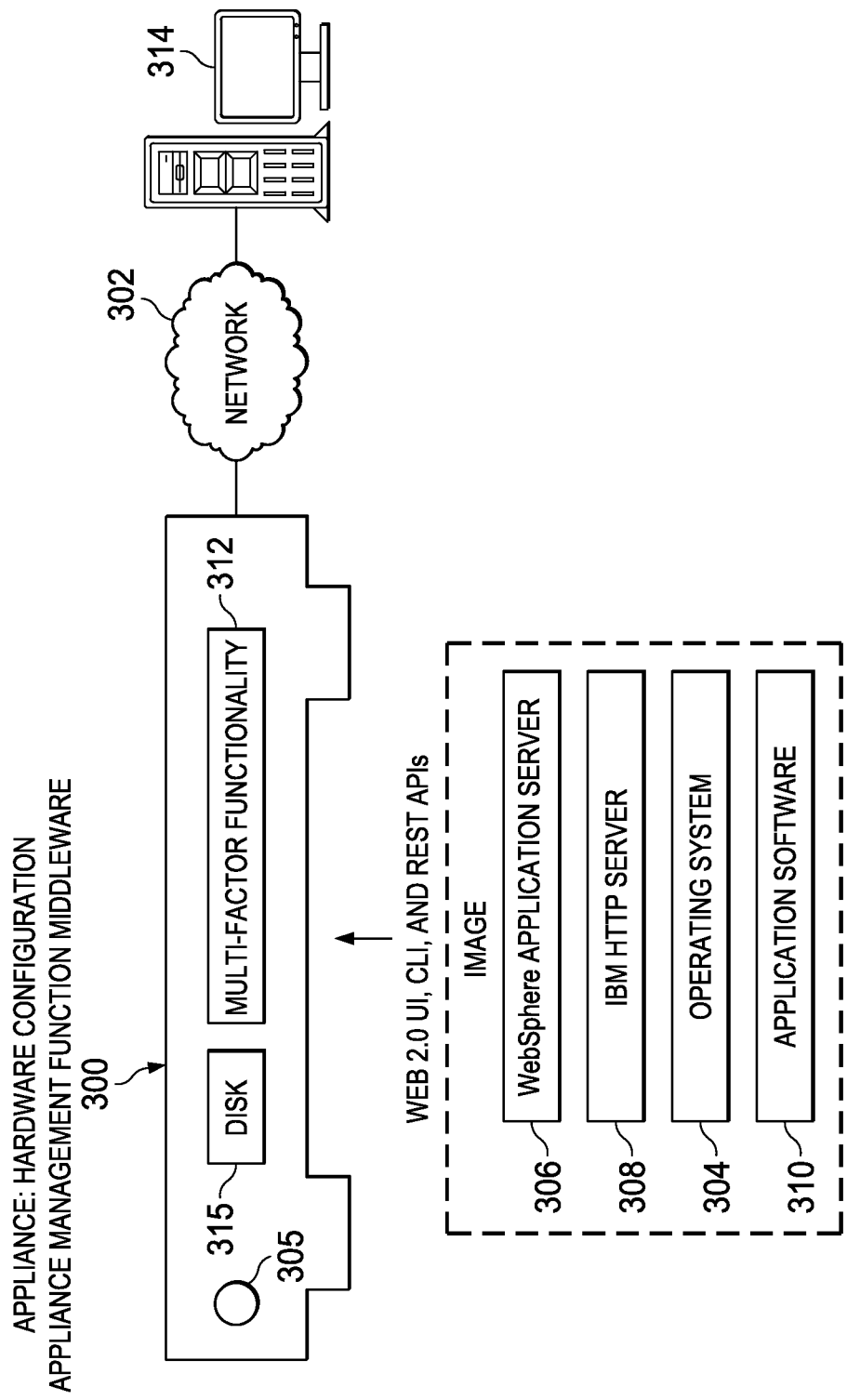
FIG. 3 illustrates an exemplary network-based secure appliance in which the disclosed subject matter may be implemented.

Referring to FIG. 3, a representative operating environment includes the physical appliance 300, which interfaces to a network 302. The appliance may be implemented using a data processing system such as described above with respect to FIG. 2, and it may represent one of the servers (or clients) shown in FIG. 1. Typically, the appliance 300 includes a Web 2.0-based user interface (UI), a command line interface (CLI), and REST-based application programming interfaces (APIs). In this example, the appliance has been provisioned with an image comprising an operating system 304, an application server 306, an HTTP server 308, and other application programs 310. Additional software solutions (not shown) may be included within the image. These software elements may come pre-loaded on the appliance, which may include other data (e.g., templates, scripts, files, etc.). The particular software configuration of course will depend on the use being made of the appliance. The appliance includes one of more storage devices (e.g., disk 315). The type and number of storage devices may vary.

Interception, Decryption and Inspection of Secure Network Communications

Figure 4:
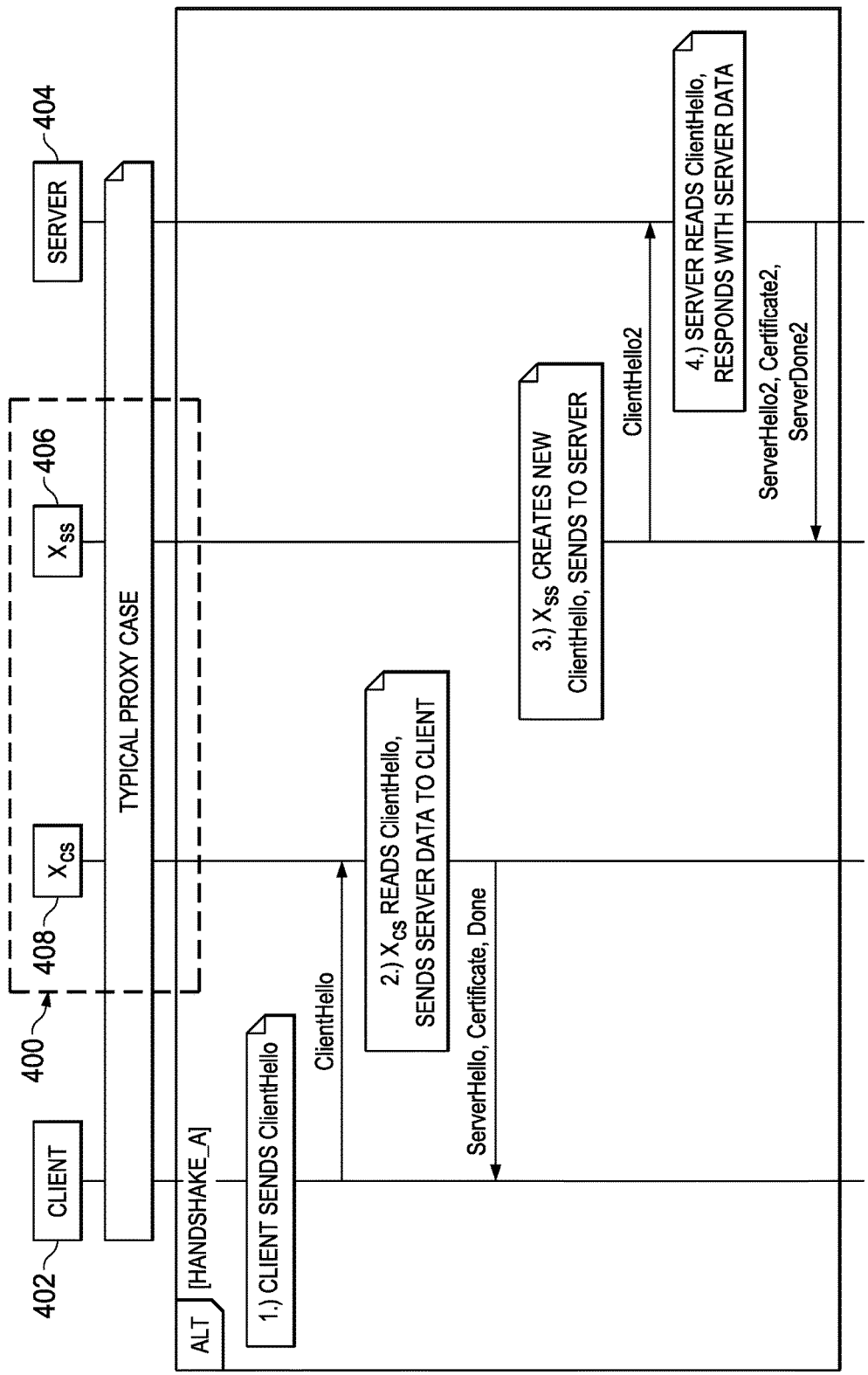
FIG. 4 illustrates how a conventional SSL/TLS communication is processed in a man-in-the-middle appliance to facilitate inspection of secure traffic.

By way of further background, FIG. 4 illustrates the basic operation of a known man-in-the-middle (MITM) device 400 for intercepting, decrypting and inspecting secure network communications according to a known technique. The device is implemented within a secure network appliance such as described above and illustrated in FIG. 3. More generally, the device is a computing system such as shown in FIG. 1.

As illustrated, the device 400 is connected between a client 402 and a server 404. The client and server are provisioned to secure communications using SSL or TLS. Familiarity with SSL/TLS is presumed. In this embodiment, the device 400 provides a transparent (or man-in-the-middle) proxy between the client 402 and the server 404 by creating and managing two (2) separate SSL/TLS sessions, one as a client process $X_{ss}$ 406 to the target server 404, and another as a server process $X_{cs}$ 408 to the initiating client 402. The $X_{ss}$ and $X_{cs}$ components are sometimes referred to herein as SSL instances, where an SSL instance typically is a piece of code that makes up an SSL session. An SSL session (or session context) is the communication itself that occurs between two endpoints. The intermediate proxy 400 thus appears to the server 404 as a client, and to the client 402 as the intended server. Communications initiated from the client 402, and any responses received from the server 404, are then available for inspection (or other processing, such as rewrite) and subsequent action. To that end, the device 400 may include a protocol analysis module (e.g., IBM Security Network Protection PAM), which provides a packet inspection function to identify and possibly mitigate network threats. The particular details of the module (or other packet inspection applications that may be supported) are not an aspect of this disclosure.

In operation, and as seen in FIG. 4, following an initial TCP handshake (not shown), the client 402 generates the SSL/TLS session initiation request (the Client Hello) to begin the SSL/TLS handshake to the server. This is step 1. The proxy intercepts this connection and directs it to the client-facing server component $X_{cs}$ 408. At step 2, the Xcs component reads the client hello, interprets the data, and responds to the client 402, typically with a server hello, a certificate, and a server done message. (As will be seen, this response (from the $X_{cs}$ back to the client) is withheld in the technique of this disclosure, which is described below). In step 3, a brand new SSL connection is configured and setup inside the appliance. This is a server facing connection that is initiated by the $X_{ss}$. The $X_{ss}$ then generates a new client hello (referred to here as ClientHello2 to distinguish it from the ClientHello in step 1), and sends the (new) client hello to the server. In step 4, the server 404 reads the new client hello and responds with ServerHello2, Certificate2 and ServerDone2. These messages are yet again distinct from the messages issued by $X_{cs}$ to the client in step 2. As a result, there are two (2) distinct connections, one between the client 402 and $X_{cs}$ 408, and the other between $X_{ss}$ 406 and the server 404. At this point, if the MITM processing (e.g., by the PAM or other application) determines that this is not a (client-server) connection is desired to be inspected, the system either must continue to inspect the connection (perhaps ignoring the results), or shut it down entirely. The determination may be based in any convenient manner, e.g., by performing a policy-based rule match against information in the certificate received from the server (Certificate2 above). As will be described, an alternative to this approach is provided by the technique of this disclosure, and by which the MITM is afforded a third option—to resume the connection (as represented by the initial client hello) that the client 402 originally attempted to make directly from the client 402 to the server 404. That operation will now be described below with respect to FIG. 5.

TLS Connection Abandoning

Figure 5:
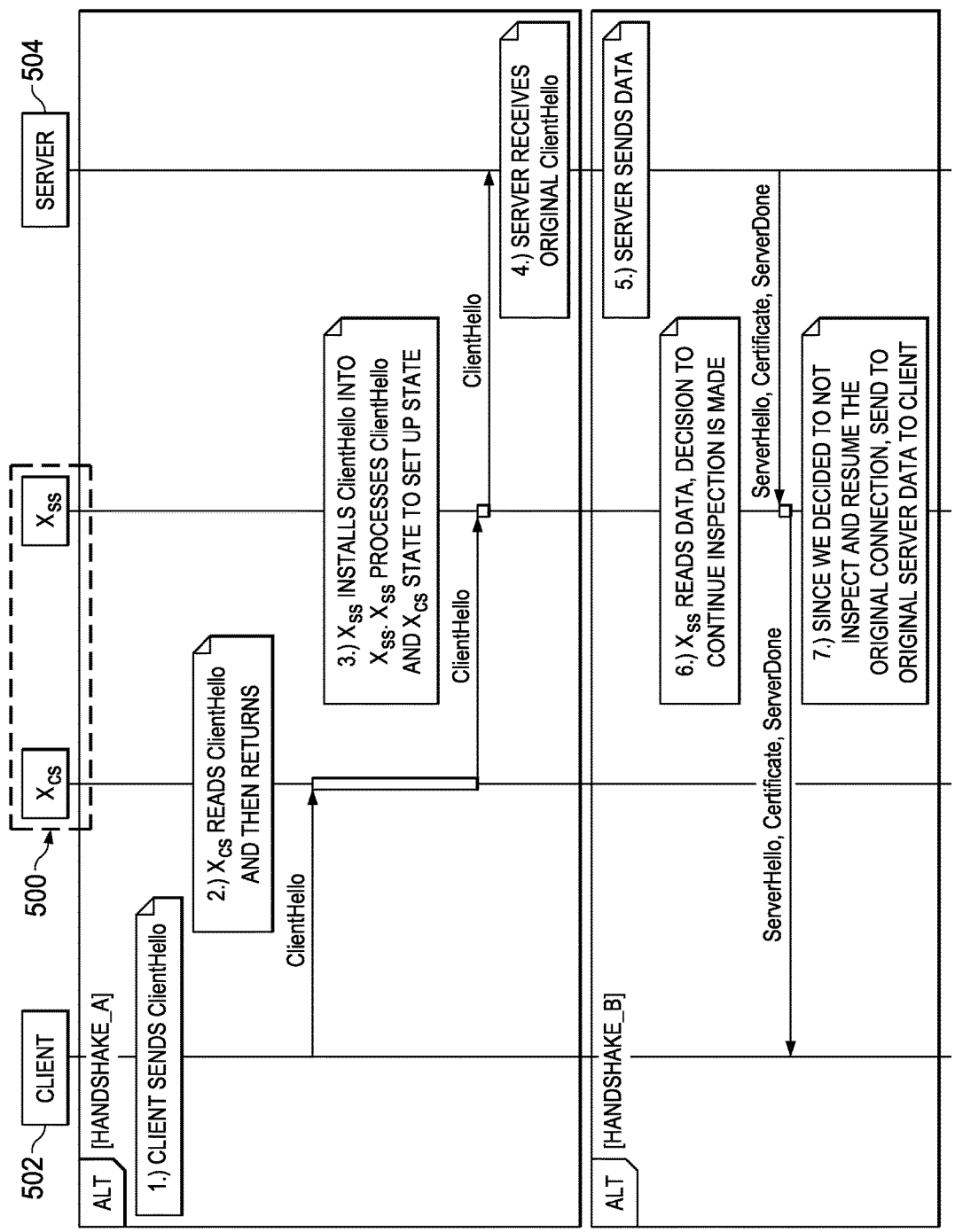
FIG. 5 illustrates the preferred technique of this disclosure by which the MITM causes its server-facing component to mimic the requesting client in a manner that enables the MITM to selectively de-insert itself and still enable the original TLS connection to be resumed.

According to this disclosure, the appliance includes a mechanism to enable the MITM process (whether proxy-based or otherwise) to resume the original connection and to re-connect the original endpoints (without inspecting), e.g., upon a rule match against a server certificate. This notion of resuming the original connection is tantamount to abandoning the TLS connection setup by the MITM device. The flow diagram in FIG. 5 illustrates similar steps to those shown in the flow diagram in FIG. 4, but altered in such a way that the original connection from the client (FIG. 4, step 1) to the original destination server is re-established. By this operation, and as will be seen, the MITM 500 transparently de-inserts itself (from the TLS connection) without interfering or signaling to either endpoint of the session being established. FIG. 5 illustrates the client 502 and server 504, together with the $X_{ss}$ 506 and the $X_{cs}$ 508, as previously described.

In step 1, and much like the scenario shown in FIG. 4, the client 502 sets up a new SSL connection directed at the server 504, and client sends a "ClientHello" as the session initiation request message. In step 2, the connection is again intercepted and read into the $X_{cs}$ 508. Unlike the prior scenario, however, the $X_{cs}$ 508 does not complete the connection by sending a response back to the client 502. Rather, in step 3, and according to this disclosure, the ClientHello is "installed" into the $X_{ss}$ 506 and the $X_{ss}$ state is setup to mimic the state of the client 502. This process will be described in more detail below.

Continuing with the flow in FIG. 5, the $X_{ss}$ releases (i.e., forwards or propagates) the original client hello to the server 504, which receives and processes that message in step 4. In step 5, the server 504 responds, typically with data that includes a ServerHello message, a server Certificate, and a ServerDone message. At this point, processing continues at the Xss 506. In particular $X_{ss}$ 506 reads the data returned from the server 504 and makes a decision whether or not to continue inspecting. In this particular scenario (as represented by the flow in FIG. 5), it is assumed that the $X_{ss}$ determines to resume the original TLS connection that was being made by the client 502 to the original destination server 504. This determination, which is step 6, may be made directly or indirectly, in the latter case by the component determining that the MITM process should not inspect the traffic flow. Thus, for example, the determination may be made by a rule match against a configured policy that indicates that traffic directed to a given domain (such as a bank or financial institution) as identified in the server certificate should not be inspected. (The particular determination of what traffic to inspect or the reasons for such determination are not material to this disclosure).

Processing then continues in step 7. At this point, and because a decision has been made to resume the original TLS connection, the original ServerHello, server Certificate, and ServerDone messages are then sent by the $X_{ss}$ 506 to the client 502. Because the original client message (the ClientHello) and original server responses (the ServerHello, server Certificate and ServerDone messages) are received by server 504 and client 502 respectively, the connection can resume as if the MITM never even attempted to inspect the connection in the first place. This completes the processing.

The above-described technique does not impair and, indeed, ensures the required guarantee of handshake message integrity that is necessary to allow the MITM to withdraw itself in this manner. As is well-known, the TLS standard (RFC 2246) requires that, as a final step in the handshaking process, both the client and server agree on a hash of all handshake messages. This hash is commonly known as the handshake message authentication code (HMAC). SSL/TLS instances implement the HMAC calculation/checking functions required to comply with the TLS standard. In the disclosed technique described above, HMAC integrity is achieved by propagating the original client hello (instead of a new client hello that would otherwise be generated), and by installing the original client hello in $X_{ss}$. By doing so, when the original TLS connection is resumed, the client and server HMAC will agree; in the case that the MITM process does not resume the original connection (but, rather, decides to keep inspecting the connection as in the prior art, the HMACs must also agree, and they do if the client hello is installed in the $X_{ss}$).

To enable the MITM process to operate as described above, it is necessary to "fake" the original server-side context and, in particular, by overwriting the initial context that the SSL/TLS code would otherwise use for a new client hello. Preferably, this is achieved through a reverse configuration of SSL state that is now described. As will be seen, this configuration technique allows the MITM process to continue to use the server-side SSL state machine in a natural way but also ensures that the exact byte sequence that the client sent is replicated on the server side ($X_{ss}$) as necessary to ensure HMAC integrity.

By way of brief background, normally when an SSL instance is created (either server- or client-facing), the ciphers and features that the instance will use are first chosen; then, and from those settings, the client hello is generated. In other words, in a conventional model (such as shown in FIG. 3), the SSL state is configured by the following ordered steps: creating an SSL instance, configuring the SSL instance (with the chosen ciphers and features), generating the output data (the new client hello), and calculating the HMAC. According to this disclosure, and in contrast, a "reverse" SSL state is configured using the original client hello, preferably as follows: creating an SSL instance, installing the output data (the original client hello), configuring the SSL instance, and then calculating the HMAC. As compared to the prior approach, the middle two steps are reversed, and the received client hello is used (in lieu of generating a new client hello).

Thus, and according to this disclosure, the notion of "installing" the client hello into $X_{ss}$ in step 3 (FIG. 5) preferably begins by instantiating a basic or minimal SSL instance ($X_{ss}$). The notion of a basic or minimal does not require any particular functionality, although typically the instance will be (as compared to a fully-featured instance) bare-boned. Next, the client hello is placed in this instance, and preferably in a same data location into which the SSL instance would place a new client hello if the handshake were attempted in the conventional manner (shown in FIG. 4). Then, and preferably based on information from the client hello, $X_{ss}$ is then configured to have the same cryptographic options as the original client. In this manner, and preferably by using only the information contained in the client hello as has been described, $X_{ss}$ thus is set up to mimic the original client as much as possible. Doing so ensures the ability of the system to maintain the guarantee of HMAC equality in the event the MITM process later determines to de-insert itself.

FIG. 6 illustrates a simplified pseudo code listing that implements the above-described reverse SSL state configuration functionality when OpenSSL is used for implementing the SSL instances. The techniques herein are not limited by any particular SSL/TLS codebase. Further, references to SSL instances or to an SSL instance are presumed to include TLS functionality. As illustrated, the operation begins at step 600 by setting up a minimal (bare bones) SSL context (an OpenSSL CTX). At step 602, preferably a minimal SSL instance is created. At step 604, the code places the original client hello in the SSL instance created in step 602. The routine continues at step 606 to gather data from the original client hello and that will be used to set up $X_{ss}$ to mimic the client. To that end, at step 608, preferably the code then configures the SSL instance, e.g., by setting TLS extensions and other cryptographic features. At step 610, the code sets a flag to indicate that the client hello (that has now been installed into the $X_{ss}$ state) should not be overwritten (which would otherwise occur in the typically SSL state configuration). Step 610 thus disables generation of a new client hello. At step 612, and because the new client hello is not generated, the code continues to perform the HMAC calculation for the client hello installed into $X_{ss}$. This completes the processing (step 3 in FIG. 3).

As a consequence of the above-described functionality, the MITM does not set up the two unique cryptographic contexts in the usual manner (FIG. 3); rather, the connection from the client to the server (and through the MITM) is the same and remains available (for resumption) even as the MITM receives and examines the server's certificate.

Preferably, when the server sends back its ServerHello and certificate, these records are held in memory while the MITM (or other local application or process) analyzes the server certificate for the rule match. The analysis may be performed on any aspect of the data received from the server. If, by policy (or otherwise), the MITM (or other application) determine that inspection of the particular flow is not to proceed, the original ServerHello and certificate are allowed out the client-facing side without more. Thereafter, and with respect to any TLS intercept, decrypt and/or rewrite functionality, the appliance ignores anything else on this flow. In this scenario, the client receives the ServerHello and certificate (and ServerDone) messages. Because the Xss has mimicked the client, the client hello sent from $X_{ss}$ to the server is exactly the same (byte-for-byte) as the one the client initially sent, HMACs are maintained, and the original TLS connection continues without the MITM.

Preferably, the server certificate (or other data received from the server) is analyzed to determine whether the TLS connection should resume prior to the $X_{ss}$ starting its key exchange with the server. Because the key exchange has not begun, there has been no selection of a cipher or transfer of cryptographic information. Thus, the technique herein further enhances processing efficiency, as such cryptographic configuration necessarily has a computational and storage cost. Of course, once such information has begun to be exchanged, it is no longer possible to abandon (resume the original) TLS connection. This is because, once any unique information is sent to either endpoint, the HMAC values will no longer match. Thus, the initiation of key exchange is the point-of-no-return for abandoning connections according to the described technique. Moreover, there is no restriction on the types of ciphers that may be used in the technique, as the decision to abandon is done before ciphers are chosen or keys are exchanged or calculated.

The SSL instances $X_{cs}$ and $X_{ss}$ need not be separate (distinct) instances. In the alternative, they may be combined or integrated, or portions of other code. As noted above, the reference to SSL instance includes an SSL/TLS instance, and a TLS instance (including current and next-generation versions). There is no restriction on the types of ciphers or that may be used, as the decision to abandon is done before ciphers are chosen or keys are exchanged or calculated.

While the techniques have been described in the context of a proxy, this is not a limitation. Generalizing, the processing described herein may be carried in any intermediary positioned between client and server. In one such embodiment, the intermediary provides transparent inline content inspection and modification. The client and server are computing entities (endpoints), and each is assumed to include a full TCP stack. The intermediary may be configured as a physical device, a virtual device, or some combination thereof. In this type of intermediary, and unlike the endpoints, the appliance does not require a TCP stack (although it may include one). TCP session rewriting may occur in an appliance of this type while keeping the stream flowing through the device alive. It can be used for a number of different applications including, without limitation, the decrypting of encrypted (SSL/TLS) sessions so that security inspection can be performed in the manner previously described. When the appliance does not include a full TCP stack, it may be provisioned to include a mechanism to monitor and track endpoint-generated retransmitted packets and acknowledgement messages as they flow through the inline network appliance. The presence of those endpoint-generated retransmitted packets and acknowledgement messages enable the appliance to know when to retransmit its own rewritten data content, or to know when to release the memory for that rewritten content.

The above-described approach provides many advantages. Current MITM systems always open two unique connections (each with a distinct cryptographic context) between the proxy itself and the client and server endpoints. The connections are unique from the moment they are opened. In the solution described herein, and in contrast, the connection between the MITM system and the client and server is the same through the point of retrieving the server's certificate message. As a consequence, the MITM can selectively and transparently abandon the TLS connection being setup and without interfering with or otherwise signaling that fact to either end of the session handled. Accordingly, significant computational and storage efficiencies for the intermediary computing system are achieved, as it is no longer required for the device to continue to decrypt traffic when a determination not to inspect has been reached.

While a preferred operating environment and use case (a secure appliance) has been described, the techniques herein may be used in any other operating environment in which it is desired to intercept, decrypt, inspect and/or modify (rewrite) network traffic to and/or from a computing system or device.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various client-side architectures (e.g., firewalls, NAT devices), and in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The appliance is not limited to any particular type. The above-described operation may likewise be used in association with any known technique or mechanism that itself is used to intercept, decrypt, inspect, modify, rewrite and re-encrypt data from any machine, irrespective of the machine's physical configuration.

The techniques herein generally provide for the above-described improvements to a technology or technical field, as well as the specific technological improvements to network-connected secure appliances, such as described above.

Having described our invention, what we now claim is as follows.

The invention claimed is:

1. A method, comprising:
responsive to detection during connection establishment of a session initiation request message from a client and intended for a server, withholding a response to the client that the session initiation request message has been received;
establishing a new session with a reverse Secure Sockets Layer (SSL) state configuration by ordered steps of initiating an SSL instance to the server, placing the session initiation request message in the SSL instance to mimic the client to the server and only then configuring a cryptographic context for the new session, the session initiation request message received from the client being used for the SSL instance in lieu of a new session initiation request, wherein placing the session initiation request message in the SSL instance and then configuring the cryptographic context overwrites an initial server-side context that would otherwise be used to send the new session initiation request to the server;

releasing to the server the session initiation request message received from the client;

receiving data from the server;

determining, based on the data by then received from the server, whether to resume establishment of the connection between the client and the server; and in response to determining to resume establishment of the connection, releasing to the client all of the data by then received from the server;

wherein each operation is carried out in software executing in a hardware element.

2. The method as described in claim 1 further including disabling generation of a new session initiation request message within the new session prior to releasing the session initiation request message.

3. The method as described in claim 1 further including maintaining a correspondence between a number of bytes associated with the session initiation request message received from the client, and a number of bytes associated with the session initiation request message released to the server such that handshake message authentication code (HMAC) integrity is maintained across a flow between the client and the server when establishment of the connection is resumed.

4. The method as described in claim 3 further including ignoring any additional traffic with respect to the flow in response to determining to resume establishment of the connection.

5. The method as described in claim 1 further including holding the data by then received from the server without forwarding to the client and analyzing a server certificate in the data against a policy to determine whether to resume establishment of the connection.

6. The method as described in claim 5 wherein the server certificate is analyzed prior to initiating a key exchange to the server with respect to the new session.

7. The method as described in claim 1 wherein, in response to determining not to resume establishment of the connection, the method further includes:

establishing man-in-the-middle connections with respect to the client and the server; and thereafter, further inspecting a flow between the client and the server.

8. Apparatus, comprising:

a processor;

computer memory holding computer program instructions executed by the processor, the computer program instructions comprising:

program code, operative in response to detection during connection establishment of a session initiation request message from a client and intended for a server, to withhold a response to the client that the session initiation request message has been received;

program code operative to establish a new session with a reverse Secure Sockets Layer (SSL) state configuration by ordered steps of initiating an SSL instance to the server, placing the session initiation request message in the SSL instance to mimic the client to the server and only then configuring a cryptographic context for the new session, the session initiation request message received from the client being used for the SSL instance in lieu of a new session initiation request, wherein placing the session initiation request message in the SSL instance and then configuring the cryptographic context overwrites an initial server-side context that would otherwise be used to send the new session initiation request to the server;

program code operative to release to the server the session initiation request message received from the client;

program code operative to receive data from the server;

program code operative to determine, based on the data by then received from the server, whether to resume establishment of the connection between the client and the server; and program code operative in response to determining to resume establishment of the connection, to release to the client all of the data by then received from the server.

9. The apparatus as described in claim 8 wherein the computer program instructions further include program code operative to disable generation of a new session initiation request message within the new session prior to releasing the session initiation request message.

10. The apparatus as described in claim 8 wherein the computer program instructions further include program code operative to maintain a correspondence between a number of bytes associated with the session initiation request message received from the client, and a number of bytes associated with the session initiation request message released to the server such that handshake message authentication code (HMAC) integrity is maintained across a flow between the client and the server when establishment of the connection is resumed.

11. The apparatus as described in claim 10 wherein the computer program instructions ignore any additional traffic with respect to the flow in response to determining to resume establishment of the connection.

12. The apparatus as described in claim 8 wherein the computer program instructions further including program code operative to hold the data by then received from the server without forwarding to the client and to analyze a server certificate in the data against a policy to determine whether to resume establishment of the connection.

13. The apparatus as described in claim 12 wherein the server certificate is analyzed prior to initiating a key exchange to the server with respect to the new session.

14. The apparatus as described in claim 8 wherein the computer program instructions further include:

program code operative in response to determining not to resume establishment of the connection to establish man-in-the-middle connections with respect to the client and the server; and program code operative thereafter to further inspect a flow between the client and the server.

15. A computer program product in a non-transitory computer readable medium for use in a data processing system, the computer program product holding computer program instructions executed by the data processing system, the computer program instructions comprising:

program code, operative in response to detection during connection establishment of a session initiation request message from a client and intended for a server, to withhold a response to the client that the session initiation request message has been received;

program code operative to establish a new session with a reverse Secure Sockets Layer (SSL) state configuration by ordered steps of initiating an SSL instance to the server, placing the session initiation request message in the SSL instance to mimic the client to the server and only then configuring a cryptographic context for the new session, the session initiation request message received from the client being used for the SSL instance in lieu of a new session initiation request, wherein placing the session initiation request message in the SSL instance and then configuring the cryptographic context overwrites an initial server-side context that would otherwise be used to send the new session initiation request to the server;

program code operative to release to the server the session initiation request message received from the client;

program code operative to receive data from the server;

program code operative to determine, based on the data by then received from the server, whether to resume establishment of the connection between the client and the server; and program code operative in response to determining to resume establishment of the connection, to release to the client all of the data by then received from the server.

16. The computer program product as described in claim 15 wherein the computer program instructions further include program code operative to disable generation of a new session initiation request message within the new session prior to releasing the session initiation request message.

17. The computer program product as described in claim 15 wherein the computer program instructions further include program code operative to maintain a correspondence between a number of bytes associated with the session initiation request message received from the client, and a number of bytes associated with the session initiation request message released to the server such that handshake message authentication code (HMAC) integrity is maintained across a flow between the client and the server when establishment of the connection is resumed.

18. The computer program product as described in claim 17 wherein the computer program instructions ignore any additional traffic with respect to the flow in response to determining to resume establishment of the connection.

19. The computer program product as described in claim 15 wherein the computer program instructions further including program code operative to hold the data by then received from the server without forwarding to the client and to analyze a server certificate in the data against a policy to determine whether to resume establishment of the connection.

20. The computer program product as described in claim 19 wherein the server certificate is analyzed prior to initiating a key exchange to the server with respect to the new session.

21. The computer program product as described in claim 15 wherein the computer program instructions further include:

program code operative in response to determining not to resume establishment of the connection to establish man-in-the-middle connections with respect to the client and the server; and program code operative thereafter to further inspect a flow between the client and the server.

* * * * *